United States Patent Office 2,765,323
Patented Oct. 2, 1956

2,765,323

PARTIAL OXIDATION OF NAPHTHALENE TO PRODUCE MIXTURES CONTAINING A HIGH PROPORTION OF NAPHTHOQUINONE

James Kenneth Dixon, Riverside, Conn., Samuel W. Tribit, Hawthorne, N. Y., and Wesley O. Fugate, Stamford, Conn., assignors to American Cyanamid Company, New York, N. Y., a corporation of Maine No Drawing. Application August 28, 1953,
Serial No. 377,248

The portion of the term of the patent subsequent to December 28, 1971, has been disclaimed

10 Claims. (Cl. 260—396)

This invention relates to a process for the vapor phase catalytic oxidation of naphthalene, to produce a converter product relatively rich in 1,4-naphthoquinone. Throughout the remainder of the specification and claims, it will be understood that the term naphthoquinone is limited to the 1,4 isomer, as the other theoretically existing isomers are not obtained by the vapor phase oxidation of naphthalene. More particularly, the invention relates to a process in which the catalyst is fluidized.

In the past, the catalytic vapor phase oxidation of naphthalene has achieved enormous commercial success for the production of phthalic anhydride. Originally, the practical processes involved converters using fixed beds of catalysts. More recently, fluidized catalyst plants have been designed for the production of phthalic anhydride.

In the production of phthalic anhydride, every effort is made to react all of the naphthalene and to produce as little naphthoquinone as possible. Unreacted naphthalene in the converter product presents a purification problem and also results in lowered yields. Similarly, naphthoquinone which tends to form colored impurities, is kept to a minimum.

Recently, there has been developed a process, described and claimed in the copending application of Lecher and Whitehouse, Serial No. 236,844, filed July 14, 1951, for the production of anthraquinones using as a raw material converter products containing naphthoquinone.

Pure naphthoquinone has been, of course, more or less of a laboratory curiosity and can not be produced on a large scale at moderate cost. Attempts have been made to produce a converter product which has a relatively higher content of naphthoquinone. These attempts have not been successful with fixed bed catalytic processes. However, we have found that with fluidized catalysts it is possible to produce a converter product having a much higher naphthoquinone content by following certain definite procedures.

The first essential of the process of the present invention is to produce a converter product which contains substantial amounts of unreacted naphthalene. This result goes directly contrary to the optimum procedures for producing phthalic anhydride. We have found that not only is it possible to increase markedly the naphthoquinone of the converter product produced but this increase is obtained without any substantial decrease in the total yield of oxidation product produced, based on naphthalene which has actually been oxidized. Since the procedure for obtaining anthraquinone described in the Lecher and Whitehouse application referred to above, automatically as a part of the process recovers unreacted naphthalene and phthalic anhydride, we have the unusual situation of an improved process of producing one constituent without adversely affecting the production of the other constituent. In order to produce a converter product containing unreacted naphthalene, we have found it necessary to operate at lower temperatures than can be used for effective production of phthalic anhydride and higher naphthalene loadings. The two factors of temperature and naphthalene loading are not independent and higher temperatures and higher naphthalene loadings are used to produce unreacted naphthalene and at lower temperatures, the loading is somewhat less. In general, the temperatures run from a minimum of 250° C. to a maximum of about 425° C. The naphthalene loadings for optimum results fall within the range from 0.5 to 2 mol % over the temperature range of 300–425° C. Slightly lower loadings may be used at still lower temperatures. The naphthalene loadings are referred to throughout the specification and claims in the conventional manner for modern vapor phase catalytic oxidation, namely, in mol percent, that is to say, mols naphthalene per hundred mols of air.

Contact time is an important factor and strangely enough, it is much longer than in the case of the production of phthalic anhydride where in the past, contact times of less than 4 seconds have been recommended. In spite of the fact that the present invention depends on a much lower degree of oxidation, which would ordinarily dictate much shorter contact times, we have found that just the opposite is true and that contact times should be 8 seconds or more. Of course, the contact time is not an isolated variable and depends to some extent on temperature. The lower limit of 8 seconds can only be used at the top of the temperature range. At lower temperatures contact times will preferably be longer and may reach 50 seconds.

As far as the operation of the fluidized catalyst converter is concerned, it is an advantage of the present invention that standard procedures may be used and no new techniques are required. Depending on the physical nature of the fluidized catalyst used, gas velocities from ½ to 3 feet per second are employed, which is in accordance with good practice. Optimum results are usually obtained with gas velocities of from 1 to 2 feet per second.

The processes of the present invention may be used with ordinary vanadium oxide catalysts which have been employed for the production of phthalic anhydride and in its broader aspects it is not intended to limit the present invention to the use of any particular catalyst. However, in a more specific aspect we have found that certain promoted vanadium oxide catalysts prepared in a particular way give optimum amounts of naphthoquinone and the use of these improved catalysts is, therefore, included as a specific modification of the invention. The preferred catalysts are promoted by oxides of metals of groups III-B and IV-A of the periodic system.

In general, it is possible by means of the present invention to produce a converter product having a naphthoquinone to phthalic anhydride ratio of from 1:1 to about 1:20. As the naphthoquinone to phthalic anhydride ratio is increased, the amount of unreacted naphthalene also increases and a compromise is usually struck between reasonable naphthoquinone content and adequate yields. The compromise is dictated largely by economic factors, one of which is the market for phthalic acid because, when the product of the present invention is used to prepare anthraquinones, the phthalic anhydride is recovered as phthalic acid. When there is a good demand for phthalic acid, therefore, the naphthoquinone content of the product should not be increased to the point where it would seriously restrict output. On the other hand, where the market for phthalic acid is not so great or where its price is sufficiently lower than that of phthalic anhydride so that transformation into the latter is uneconomic, it pays to strive for maximum naphthoquinone content even at some loss of phthalic anhydride. It is an advantage of the present invention that it is very flexible and the best compromise can be chosen to suit the economic conditions.

It is possible to operate the process of the present invention in a manner so that it is not necessary to regenerate the catalyst at frequent intervals. This, however, will normally require either higher temperatures or lower naphthalene loadings and with some catalysts results in a less satisfactory naphthoquinone content. It is possible to operate with higher naphthalene loadings and/or lower temperatures so that the catalyst is gradually reduced, that is to say, the vanadium oxide is gradually transformed from the pentavalent to the tetravalent form. This requires regeneration of the catalyst by air at reaction temperatures and can be effected either by batch regeneration processes or by continuously regenerating a portion of the catalyst. Continuous regeneration can be carried out very effectively by introducing the air and naphthalene vapors into different parts of the fluidized catalyst bed. Thus, hot air, or a portion of the hot air may be introduced in the bottom of the converter and naphthalene vapors introduced at some higher point in the catalyst bed as described in greater detail and claimed in our copending application Serial No. 569,991 filed March 7, 1956.

The invention will be described in greater detail in conjunction with the following specific examples. The parts shown are by weight.

*Example 1*

The aluminum oxide-$V_2O_5$ catalyst was prepared by adding to 31.5 lbs. of 30° Bé. potassium silicate solution in 86 lbs. of water, 30.5 lbs. of 17% sulfuric acid, the addition being rapid and with constant stirring. The pH was then adjusted to 8.0 by the addition of concentrated ammonium hydroxide, and 8.55 lbs. of ammonium metavanadate dissolved in 26.5 lbs. of water, containing 350 cc. of ammonium hydroxide, was then added to the slurry. Then 342 grams of potassium aluminum sulfate and 2.1 liters of hot water also were introduced and the slurry concentrated by evaporation to about half its original volume. A gel formed, which was dried at 100° C., calcined at 450° C. and ground to fluidized catalyst fineness.

*Example 2*

The procedure of Example 1 was followed but the potassium aluminum sulfate was replaced with 135 grams of zirconium nitrate in 1.5 liters of water.

*Example 3*

953 parts of 30° Bé. potassium silicate solution and 2600 parts of water was mixed with 57 parts of ammonium metavanadate and 920 parts of 17% sulfuric acid, and the pH adjusted to 6.0 by means of concentrated ammonium hydroxide. The temperature was then raised to about 65° C. and 9 parts of zirconium nitrate dissolved in 100 parts of water added. The slurry was aged at the same temperature and then the temperature raised to evaporate the water until the volume was reduced by from ½ to ⅔. The orange colored slurry was then dried at 100° C., calcined at 450° C. and ground to fluidized catalyst fineness.

*Example 4*

953 grams of 30° Bé. potassium silicate was dissolved in 2600 ml. water, placed in an enameled pail and stirred. 57 g. of powdered ammonium metavanadate was added slowly and allowed to dissolve. 920 g. of 17% sulfuric acid was then added and the gel brought to pH 8 with ammonia. The temperature of the thick gel was brought to 65° C. and a solution of 13.5 g. thorium nitrate in water added. The gel was stirred at 65° C. for one hour. Then the temperature was raised to 95–100° C. and the slurry evaporated with stirring to one third of its original volume. The product was placed in a tray and dried at 110° C. ignited at 450° C., ground and sized in the usual way.

*Example 5*

The procedure of Example 4 was followed except that the pH of the gel after sulfuric acid addition was brought to 6 instead of 8.

*Example 6*

The procedure of Example 1 was followed but the pH was adjusted with ammonium hydroxide to 6 instead of 8.

*Example 7*

A series of fluidized catalyst runs were made with various aluminum oxide promoted vanadium pentoxide catalysts prepared according to Example 1, zirconium promoted catalysts prepared according to Examples 2 and 3, and thorium catalyst prepared according to Examples 4 and 5. In each run conventional vapor phase catalytic operations were followed, that is to say, a mixture of naphthalene vapor and air were passed at an elevated temperature through a fluidized catalyst zone in a converter. The rate of flow of the gases as determined by contact time was maintained within the conventional range in which fluidized catalysts are suspended in the flowing vapors to form a fluidized zone. The conditions and the results obtained are shown in the following table in which the abbreviation NQ is used for naphthoquinone and PAA for phthalic anhydride. Naphthalene concentration is expressed conventionally in mol percent, that is to say, mols of naphthalene per hundred mols of air.

| Catalyst | Inlet Conc., Mole percent | Temp., ° | Contact Time, Sec. | Yields lbs./100 Naphthalene | | Naphthalene |
|---|---|---|---|---|---|---|
| | | | | N. Q. | P. A. A. | |
| $Al_2O_3$—$V_2O_5$ | 1.1 | 300 | 8 | 23–26 | 45–55 | 31–43 |
| $Al_2O_3$—$V_2O_5$ | 1.1 | 290 | 11 | 20–25 | 50–60 | 28–41 |
| $Al_2O_3$—$V_2O_5$ | 2.0 | 305 | 11 | 20–25 | 50–60 | 28–41 |
| $Al_2O_3$—$V_2O_5$ | 1.3 | 315 | 8 | 20–23 | 55–60 | 26–36 |
| $Al_2O_3$—$V_2O_5$ | 1.7 | 310 | 11 | 20–22 | 55–65 | 26–36 |
| $Al_2O_3$—$V_2O_5$ | 1.6 | 305 | 13 | 19–23 | 45–55 | 34–45 |
| $ZrO_2$—$V_2O_5$ Neutralized to pH 6 | 1.0 | 330 | 8 | 25–35 | 40–60 | 20–45 |
| | 1.0 | 320 | 12 | 25–33 | 45–60 | 22–42 |
| | 2.0 | 330 | 12 | 25–33 | 45–60 | 22–42 |
| $ZrO_2$—$V_2O_5$ Neutralized to pH 8 | 1.0 | 300 | 8 | 20–26 | 45–55 | 31–44 |
| | 1.0 | 290 | 11 | 20–25 | 50–60 | 28–40 |
| $ThO_2$—$V_2O_5$ Neutralized to pH 8 | 1.0 | 310 | 8 | 23–25 | 50–60 | 28–38 |
| $ThO$—$V_2O_5$ Neutralized to pH 6 | 1.0 | 330 | 8 | 25–34 | 45–60 | 21–42 |

The data on yields in the above table are given in the form of ranges representing the results of a number of runs under the conditions as given. Some of the runs were made in a laboratory converter and some in a converter of pilot plant capacity.

The catalysts described in Examples 2–5 are new catalysts and are not specifically claimed in the present invention. They form the subject matter of copending application of Tribit and Fugate, Serial No. 236,843, filed July 14, 1951. This application is a continuation-in-part of our prior application Serial No. 236,842, filed July 14, 1951, and abandoned concurrently with the filing of this application.

We claim:
1. A process of oxidizing naphthalene to produce a product rich in 1,4-naphthoquinone, which comprises vaporizing naphthalene, producing an air-naphthalene mixture having a concentration of from 0.5–2.0 mol percent of naphthalene, and passing the mixture through a fluidized catalyst bed, said catalyst comprising a silica gel having vanadium pentoxide as its principal catalytic ingredient, stabilized with an alkali metal salt, the said passage over the said catalyst being at a temperature of 250°–425° C., and at a contact time of 8–50 seconds, and during said passage maintaining a concentration of at least 20% of the intake naphthalene in the exit gases by keeping the said temperature and contact time sufficiently low and the said concentration of naphthalene in air sufficiently high, that the mixture emerging from the catalyst bed contains the said quantity of unreacted naphthalene.

2. A process according to claim 1 in which the alkali metal salt is potassium sulfate.

3. A process of oxidizing naphthalene to produce a product rich in 1,4-naphthoquinone, which comprises vaporizing naphthalene, producing an air-naphthalene mixture having a concentration of from 0.5–2.0 mol percent of naphthalene, and passing the mixture through a fluidized catalyst bed, said catalyst comprising a silica gel having vanadium pentoxide as its principal catalytic ingredient, stabilized with an alkali metal salt, and promoted with an oxide of a metal selected from group III–B and group IV–A of the periodic system, the said passage over the said catalyst being at a temperature of 250°–425° C., and at a contact time of 8–50 seconds, and during said passage maintaining a concentration of at least 20% of the intake naphthalene in the exit gases by keeping the said temperature and contact time sufficiently low and the said concentration of naphthalene in air sufficiently high, that the mixture emerging from the catalyst bed contains the said quantity of unreacted naphthalene.

4. A process according to claim 3 in which the metal is aluminum.

5. A process according to claim 4 in which the temperature is between 300–425° C.

6. A process according to claim 3 in which the metal is zirconium.

7. A process according to claim 6 in which the temperature is between 300–425° C.

8. A process according to claim 3 in which the metal is thorium.

9. A process according to claim 8 in which the temperature is between 300–425° C.

10. A process according to claim 3 in which the gel formation is effected at a pH not exceeding 6.

References Cited in the file of this patent

UNITED STATES PATENTS

| | | |
|---|---|---|
| 2,395,638 | Milas | Feb. 26, 1946 |
| 2,480,072 | Ziegler | Aug. 23, 1949 |
| 2,480,669 | Payne | Aug. 30, 1949 |
| 2,487,564 | Layng | Nov. 8, 1949 |
| 2,698,330 | Fugate | Dec. 28, 1954 |